Figure 3:
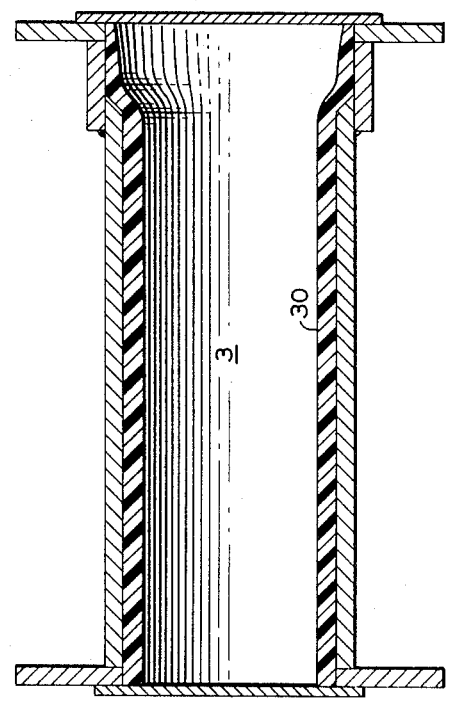

United States Patent

[11] 3,587,137

| [72] | Inventor | William Griff Baldridge<br>Troy Hills, N.J. |
|---|---|---|
| [21] | Appl. No. | 661,996 |
| [22] | Filed | Aug. 21, 1967 |
| [45] | Patented | June 28, 1971 |
| [73] | Assignee | Druid Plastics, Inc., Hanover, N.J. |

[54] PLASTIC PIPE MAKING APPARATUS
7 Claims, 3 Drawing Figs.

[52] U.S. Cl. .................................................. 18/26,
 25/30
[51] Int. Cl. ................................................... B29c 5/00
[50] Field of Search ........................................ 18/26 (R),
 19 (.0); 25/30 (R)

[56] References Cited
UNITED STATES PATENTS

| RE25,587 | 6/1964 | Wiltshire ...................... | 18/26R |
| 2,377,946 | 6/1945 | Leary ........................... | 18/19-0 |
| 2,904,836 | 9/1959 | Jefferson et al............... | 18/26R |
| 2,908,039 | 10/1959 | Amos ............................ | 18/26R |
| 3,134,140 | 5/1964 | Knowles ........................ | 18/26R |

*Primary Examiner*—J. Spencer Overholser
*Attorney*—Howard R. Popper

ABSTRACT: Plastic duct or tubing is fabricated in a rotational mold by heating the mold containing plastic powder or granules and rotating the mold at speeds lower than that at which centrifugal forces become appreciable.

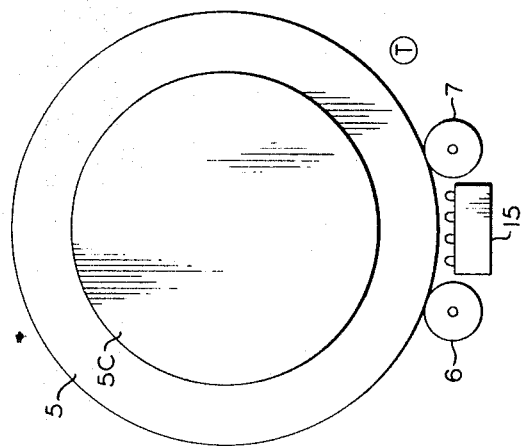
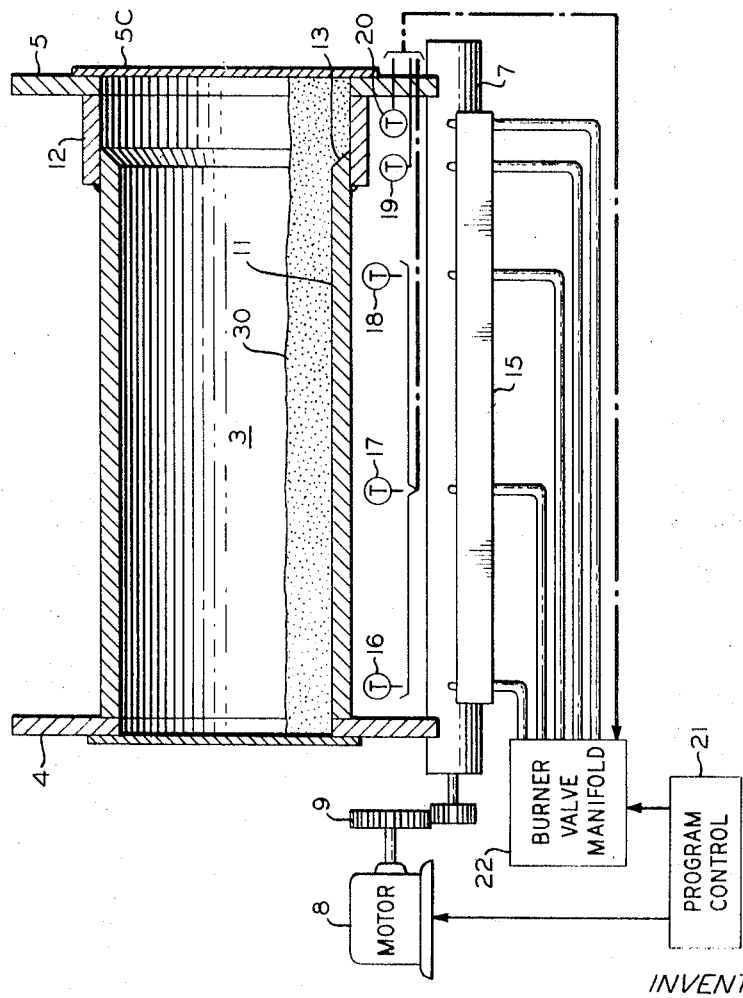

INVENTOR
WM. GRIFF. BALDRIDGE

ATTORNEY

PLASTIC PIPE MAKING APPARATUS

This invention relates to plastic fabrication and more particularly to the manufacture of cylindrical plastic shapes such as pipe, drum, etc.

Pipe of different materials has heretofore been produced by a variety of methods including extrusion and casting. Each of these prior methods, while satisfactory for many purposes, exhibits a characteristic deficiency. Thus, extrusion processes are generally limited to the production of pipe having moderate and constant diameter. Cast pipe invariably shows seam marks and difficulty is sometimes encountered in removing the internal core of the mold without damaging the pipe. Additional machining steps have therefore been required to remove such mold marks and to produce pipe with sections of different diameters and cross sections.

In addition to the foregoing methods, a form of casting known as centrifugal casting has been employed for certain materials but the high speeds involved have required elaborate and expensive machinery.

Accordingly, it is an object of the present invention to provide an inexpensive casting method which is capable of producing special cross-sectional cylindrical shapes without additional machining.

It is another object of this invention to provide apparatus for casting cylindrical plastic shapes without the need for internal cores or armatures.

In accordance with the principles of the present invention, I provide a method for casting cylindrical plastic shapes employing a drum mold which advantageously may be rotated at speeds lower than that at which centrifugal forces would produce noticeable effects. A charge of plastic powder or granules is introduced at the mouth of the rotating drum and rotation is continued until the charge is levelly distributed parallel to the axis of drum rotation. Heat is selectively initially applied along the drum to melt the charge to a viscous consistency. I have discovered that during this initial melting of the charge a greater cross-sectional mass of the casting may be produced by selectively applying more heat to the drum at specified portions along its length. The amount of this selectively applied heat should be in addition to whatever heat would otherwise be needed to provide uniform heating to the charge through parts of the mold that are of heavier cross section or which exhibit greater heat radiating characteristics than other sections of the mold. I have applied this discovery in the illustrative embodiment to the production of "bell-end" pipe having a tapered internal diameter in the region of the bell portion. When the desired cross-sectional distribution has been obtained, I increase the heat to obtain homogeneity of melting through and through the cross section of the charge and then I further raise the temperature to the "cure" or glazing heat specified by the manufacturer of the plastic material. I then allow the mold to cool through the stabilizing heat range after which the mold may be further cooled to the ambient temperature. The completed cylindrically cast plastic shape may then be removed from the mold.

Accordingly, it is a feature of the present invention to selectively apply heat to a rotating mold containing a plastic charge to control the cross-sectional mass of the casting.

It is another feature of the present invention selectively to apply additional initial heat to those portions of the mold at which it is desired to produce a thicker cross section in the casting.

The foregoing and other features may become more apparent by referring now to the drawing in which:

FIGS. 1 and 2, respectively, show schematic side and end views of the apparatus of the present invention with the plastic charge distributed in the drum; and FIG. 3 shows the finished plastic casting produced by my invention just prior to its removal from the drum.

Referring now to FIG. 1, the rotating drum mold 3 is shown supported at flanges 4 and 5 by drive rollers 6 and 7 (FIG. 2). Drive rollers 6 and 7 are powered by variable speed motor 8 through train drive 9. The drum mold 3 includes a first cylindrical portion 11 and a larger diameter second cylindrical portion 12. Any suitable metal capable of withstanding the temperature normally to be encountered in handling hot plastics without undue corrosion may be employed for the drum 3 and I have found common steel to be quite satisfactory. At the low rotational speeds employed in practicing my invention, I have found it unnecessary to provide any additional bearings for the drum 3, its own weight resting upon drive rollers 6 and 7 being sufficient for the purpose. As a further economy, particularly when the drum mold 3 is larger than about 6 inches in diameter in the first portion 11, I have found it convenient to weld the larger portion 12 over the outside of the portion 11 so that only a minimum of internal machining is required. Such machining as is found necessary may easily be accomplished at the chamfer region 13 to accommodate any external contour desired of the casting to be produced.

It is to be understood that providing the drum 3 with the larger diameter portion 12 is one of the necessary mold characteristics required for the production of the so-called bell-end cast pipe. Bell-end pipe is usually employed in assemblies of several sections each of which pipe sections has one plain and one bell-end. The purpose of the bell-end is to receive the plain end of the next pipe section. The fitting together of such sections without splitting is of course aided when the interior of the bell portion is somewhat tapered. Heretofore the production of this taper has necessitated that a forming tool be employed during casting or that the casting be later machined. However, I have found that by controlling the application of heat to the drum 3 this taper can be achieved during the casting process without any tools whatsoever.

To control the internal taper of the casting, I provide a burner bank 15 individual sections of which are supervised by corresponding thermostats 16—20. Each thermostat controls the heat output of its respective portion of the burner bank so that heat may be applied selectively to the various portions of drum 3. For example, thermostats 16 and 20 may be set to produce a higher heat output from their portion of burner bank 15 than thermostats 17 or 18 to compensate for the greater heat radiating characteristics exhibited by the drum 3 in the region of its flange end 4 and 5. Similarly, thermostat 19 would normally be set to call for a higher heat output than thermostats 17 or 18 to compensate for the heavier wall section caused by the overlap of the first and second portions 11 and 12 of the drum 3. This setting would not however usually be so high as thermostats 16 or 20 especially if all that was desired was to obtain a casting with a straight rather than a tapered inside diameter. However, I have discovered that by increasing the initial heating of a particular section of mold 3 after the plastic charge has been introduced I can cause a greater buildup of plastic wall to take place in the casting. I have put this to use in the illustrative embodiment by creating a tapered inside diameter for the bell-end portion of the pipe being cast in the section of drum 3 adjacent to thermostat 19. This is accomplished by setting this thermostat to call for a greater initial heat output from its associated portion of burner bank 15 than would otherwise be required to compensate for the overlap of drum mold portions 11 and 12. I believe that the reason for this greater buildup of wall thickness in the casting is due to the fact that the portion of the plastic charge which first receives the heat from burner bank 15 becomes "sticky" and therefore picks up the dry particles of charge which are adjacent thereto. These particles in turn become heated and cause further pickup. In the meantime, the temperature of the adjacent particles is also being increased and their tendency to pickup begins to balance that of the initially heated portion of charge. However, there is not enough mobility in the charge at this point for the process fully to equalize and so the earlier heated portion retains its greater share of picked up material. This additional material buildup is what accounts for the internal taper assumed by the plastic casting 30 as shown in FIG. 3. The rotational motion imparted to drum mold 3 by the motor, train-drive and roller combination assists in this material pickup process which occurs at speeds lower than those which would cause the granules to be impelled against the inner walls of the drum mold by centrifugal force. This is what I have previously referred to as speeds lower than those producing noticeable centrifugal force effects. The rotational motion also is principally responsible in the illustrative embodiment for the initial level distribution of the charge 30 (FIG. 1) throughout the length of the drum 3. Thus, when loading the cold drum it is merely necessary to remove the end plate 5C from flange 5 and insert the charge of granules at the end. A few minutes of rotation has then been found sufficient to levelly distribute the charge in the mold.

Mention has been made of the initial, curing and stabilizing heats applied to the mold. Advantageously, the time of application thereof may be regulated by program control 21. Any available control unit may be employed for this purpose, it merely being necessary to specify the heat parameters, i.e., the number of burner valves in manifold 22 to be operated, the degree to which each valve shall be opened (in accordance with the dictates of its respective one of thermostats 16—20) and when each is to be adjusted. Of course, it is to be understood that electrical heating apparatus may be substituted for the burner bank 15 in which case appropriate rheostat devices would be employed instead of burner valve manifold 22.

While in the drawing the heat applying means, i.e., burner bank 15, has been shown positioned at the bottom of drum 3, it should be appreciated that the heating means whether burners, electric radiators, or even hot liquid spray nozzles may be located at various other points along the drum with equally advantageous results.

In one particular embodiment wherein the drum 3 had an inside diameter of 18⅜ inches, an end diameter of 19⅙ inches and 81 pounds of low density polyethylene powder was the charge, the following combinations of temperature and rotational speed were dictated for the indicated time periods by program control 21:

| Time minutes | Temperature, °F. | | | Speed, approximate r.p.m. | Comment |
|---|---|---|---|---|---|
| | T19 | T17, 18 | T16, 20 | | |
| 5 | Ambient | | | 15 | Distribute charge. |
| 15 | 275 | 250 | 260 | 15 | |
| 10 | 425 | 400 | 410 | 15 | |
| 10 | 450 | 450 | 450 | 15 | |
| 10 | 300 | 300 | 300 | 15 | |
| 15 | — | — | — | 12 | Heat turned off. |
| — | — | — | — | — | Apply coolant to drum. |

It should be borne in mind that the above-described pickup of material which occurs during the initial heat and which material pickup leads to the desirable internal taper occurs because no appreciable centrifugal forces are applied to the granules or powdered charge.

The foregoing has been descriptive of one illustrative embodiment of the invention. Other embodiments will suggest themselves to those skilled in the art without need of making departure from the true spirit and scope of this invention.

I claim:

1. Apparatus for molding plastic materials comprising a drum for receiving a charge of plastic granules, means for rotating said drum about a horizontal axis at a speed sufficient to levelly distribute said granules but at a speed lower than the speed at which centrifugal force has an appreciable effect upon the tumbling of said granules, an array of heat-applying means disposed along the outside of said drum, and means for selectively controlling the heat output of said heat-applying means to apply greater amounts of initial heat to portions of said drum at which heavier wall sections of plastic being cast from said granules shall be produced.

2. Apparatus according to claim 1 wherein said means for selectively controlling said heat-applying means includes means for gradually equalizing the amount of heat applied to said drum after the application of said initial heat.

3. Apparatus in accordance with claim 2 wherein said drum includes portions exhibiting nonuniform heat transmitting characteristics and wherein said means for selectively controlling said heat-applying means includes means for applying different amounts of initial heat to said different portions to compensate for said different heat transmitting characteristics.

4. A system for fabricating hollow rotational shapes of plastic articles having selectively determinable wall thicknesses comprising
   a rotatable drum for receiving a charge of plastic material in powder or granular form, said drum having an internal contour conforming to the external wall of the article to be fabricated,
   means for rotating said drum,
   means for applying heat to said drum, and
   means for selectively controlling said rotating and said heat-applying means to
   a. rotate said drum before any heat is applied to distribute said charge along said internal contour of said drum,
   b. apply a greater initial heat to portions of said drum corresponding to portions of said article which are to have a greater wall thickness than the remainder of said article,
   c. maintain the rotation of said drum during the application of said heat at a speed lower than that at which centrifugal force would affect the tumbling of the particles comprising said powder or granular charge of plastic material.

5. A system for fabricating hollow rotational shapes according to claim 4 wherein said means for selectively controlling said rotating and said heat-applying means includes a plurality of thermostats positioned adjacent to said drum and program control means operated by said thermostats.

6. A system for fabricating hollow rotational shapes of plastic articles having selectively determinable wall thicknesses comprising
   a rotatable drum for receiving a charge of plastic material in powder or granular form, said drum having an internal contour conforming to the external wall of the article to be fabricated,
   means for rotating said drum,
   means for applying heat to said drum,
   first thermostat means positioned adjacent a first portion of said drum for defining a region at which a relatively thick wall section of said plastic article is to be produced,
   second thermostat means positioned adjacent a portion of said drum for defining a region at which a relatively thinner wall section of said article is to be produced, and
   program control means responsive to said first and second thermostat means for regulating said heat-applying and drum rotating means to cause said heat-applying means initially to apply a greater heat to said first portion of said drum and to regulate said rotating means to rotate said drum at a speed lower than the speed at which centrifugal force would affect the tumbling of the particles comprising said charge of plastic material.

7. A system according to claim 6 wherein said program control means regulates said heat-applying means in accordance with said second thermostat means after a substantial portion of said charge of plastic material has begun to melt.